Figure 7:
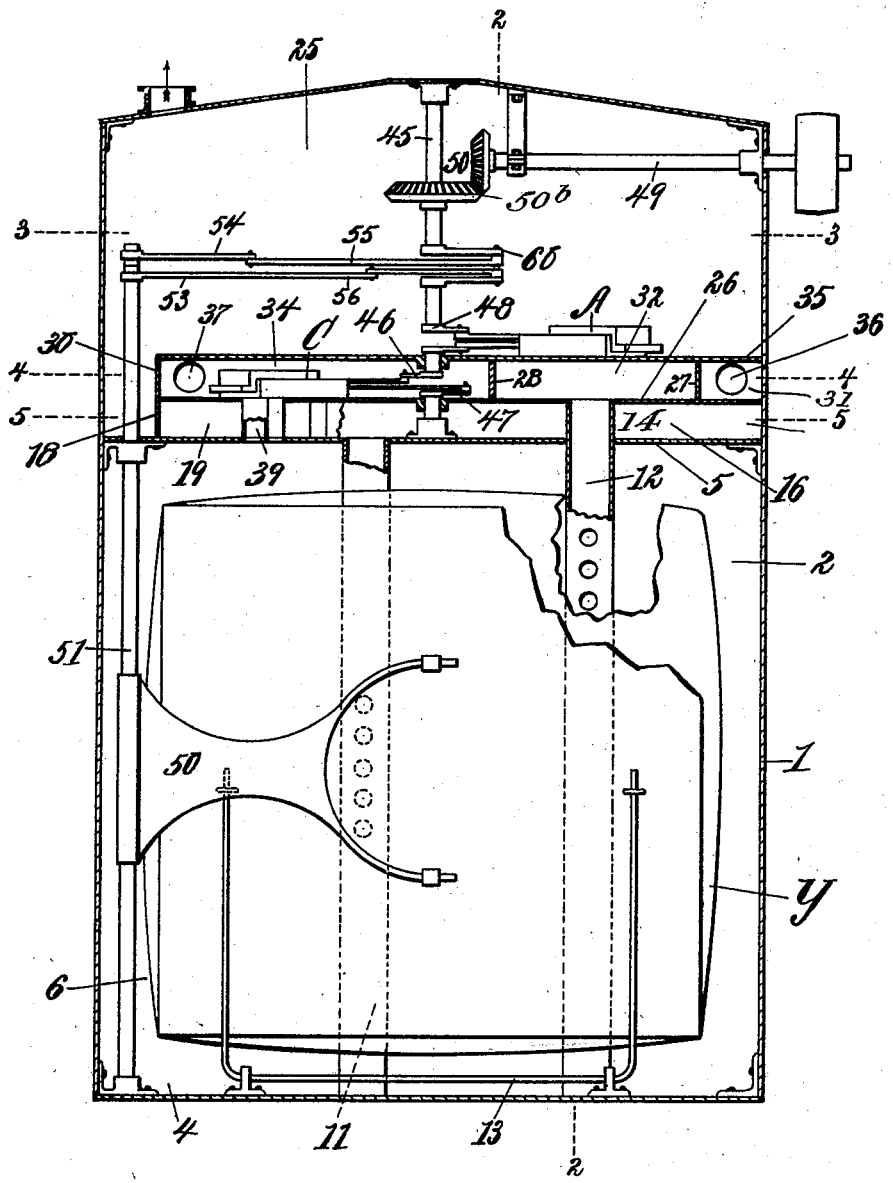

No. 718,472. PATENTED JAN. 13, 1903.
J. F. W. JOST.
GAS AND AIR MIXER.
APPLICATION FILED OCT. 2, 1900. RENEWED MAY 31, 1902.
NO MODEL. 5 SHEETS—SHEET 1.

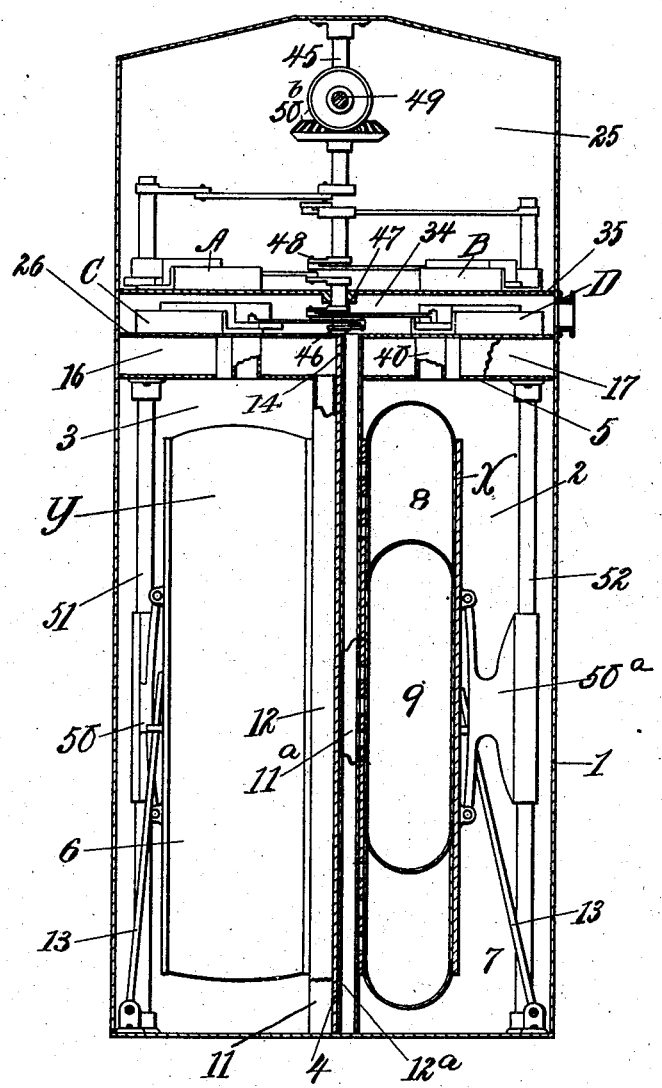

No. 718,472. PATENTED JAN. 13, 1903.
J. F. W. JOST.
GAS AND AIR MIXER.
APPLICATION FILED OCT. 2, 1900. RENEWED MAY 31, 1902.
NO MODEL. 5 SHEETS—SHEET 3.
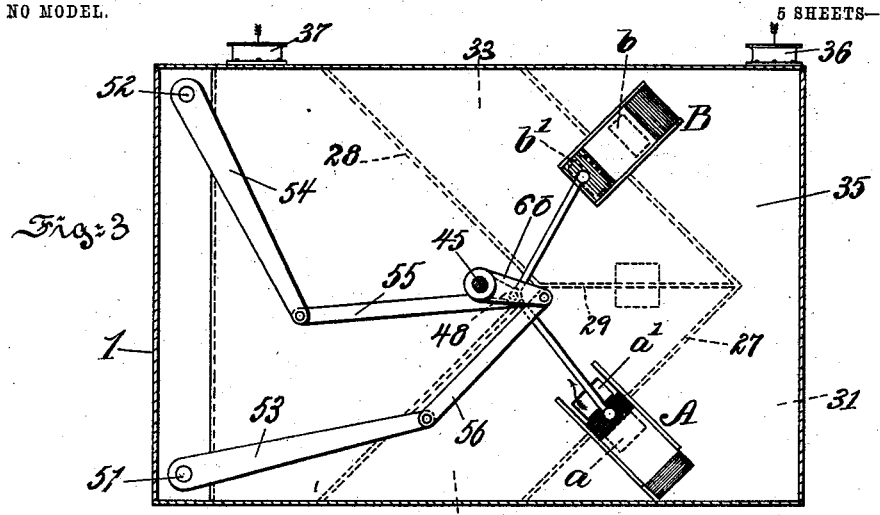
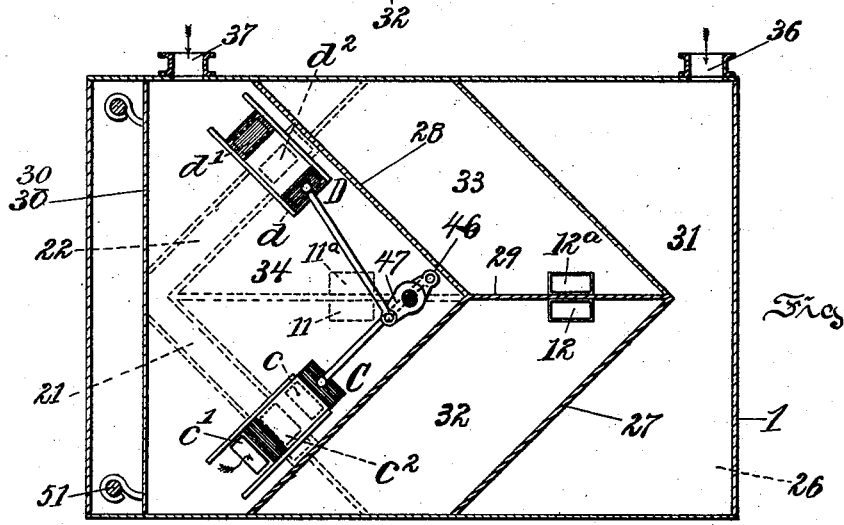
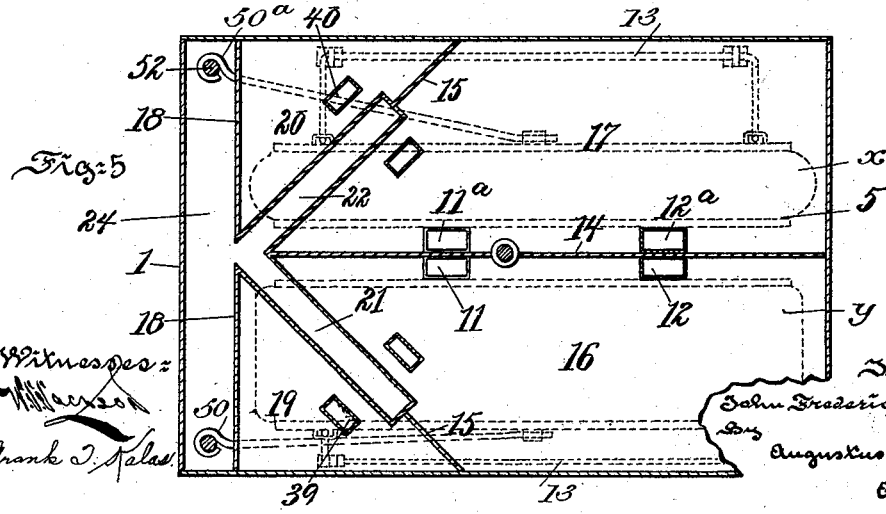

No. 718,472. PATENTED JAN. 13, 1903.
J. F. W. JOST.
GAS AND AIR MIXER.
APPLICATION FILED OCT. 2, 1900. RENEWED MAY 31, 1902.
NO MODEL. 5 SHEETS—SHEET 4.
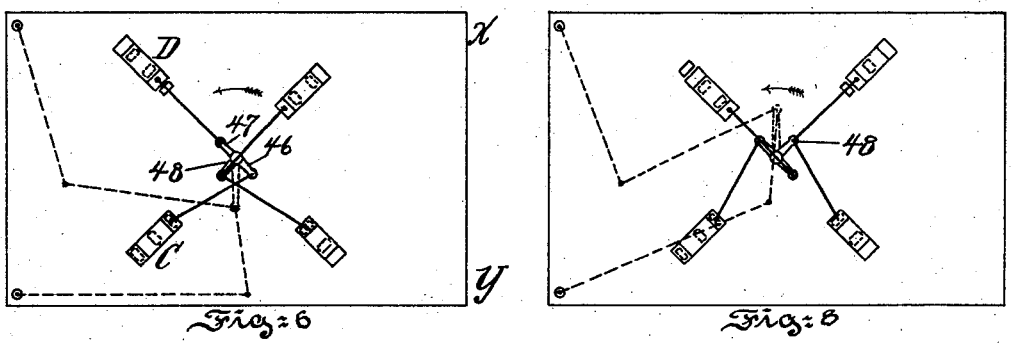
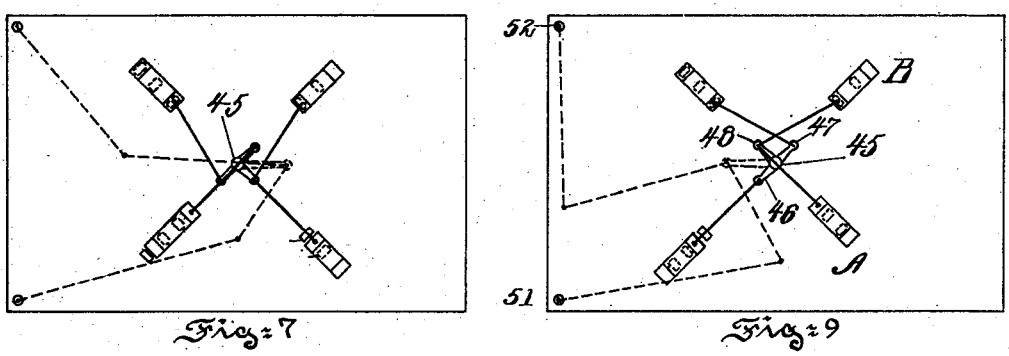
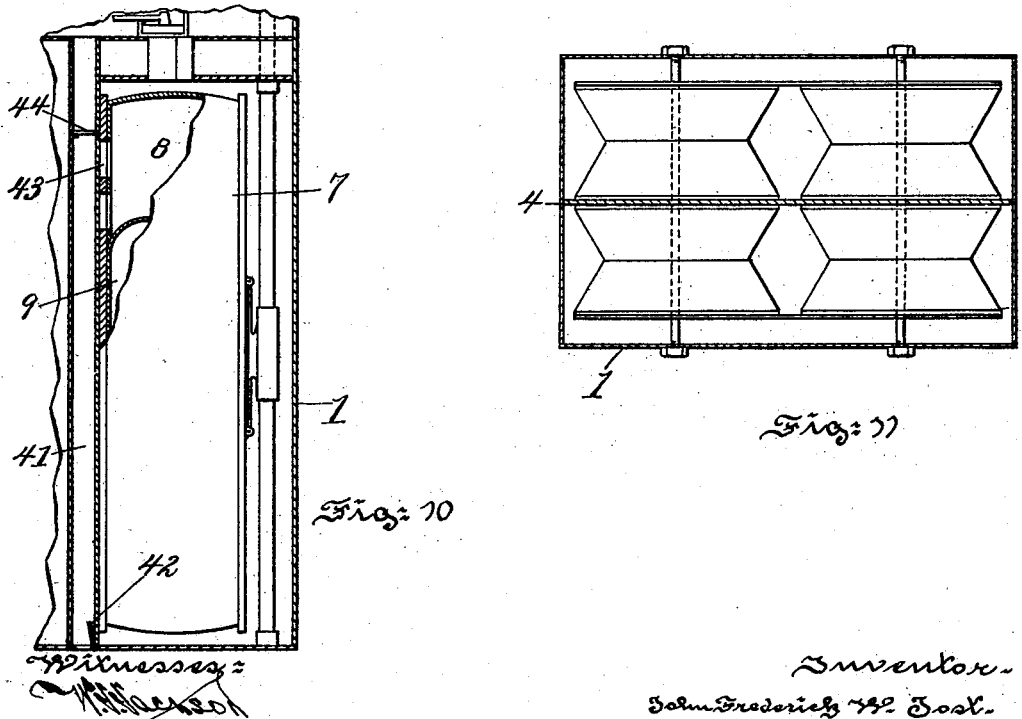

No. 718,472. PATENTED JAN. 13, 1903.
J. F. W. JOST.
GAS AND AIR MIXER.
APPLICATION FILED OCT. 2, 1900. RENEWED MAY 31, 1902.
NO MODEL. 5 SHEETS—SHEET 5.
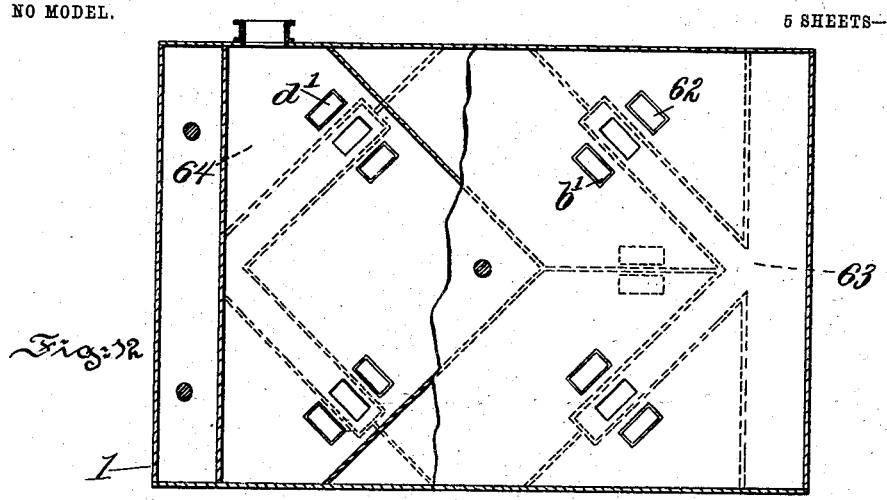
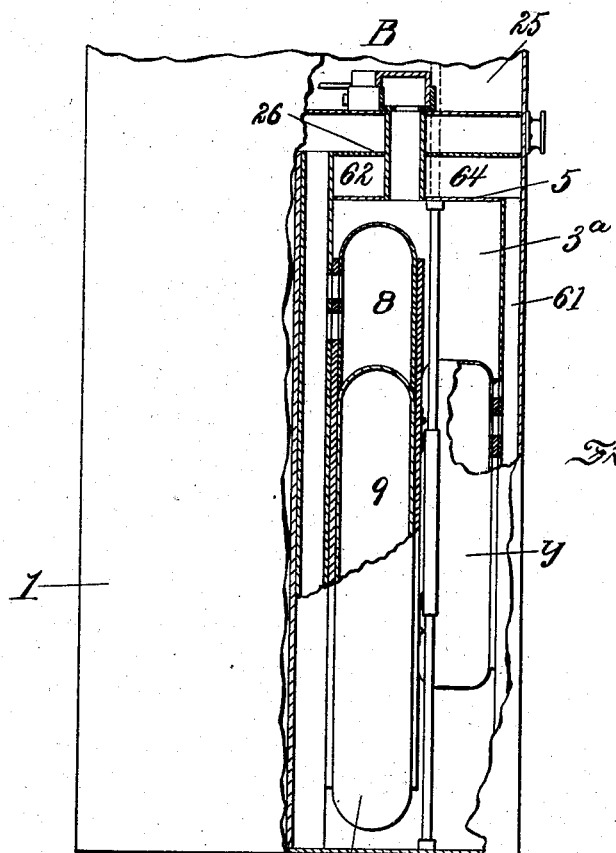

UNITED STATES PATENT OFFICE.

JOHN FREDERICK W. JOST, OF PHILADELPHIA, PENNSYLVANIA, ASSIGNOR TO WELSBACH LIGHT COMPANY, OF GLOUCESTER CITY, NEW JERSEY, A CORPORATION OF NEW JERSEY.

GAS AND AIR MIXER.

SPECIFICATION forming part of Letters Patent No. 718,472, dated January 13, 1903.

Application filed October 2, 1900. Renewed May 31, 1902. Serial No. 109,786. (No model.)

*To all whom it may concern:*

Be it known that I, JOHN FREDERICK W. JOST, a citizen of the United States, residing at Philadelphia, in the county of Philadelphia and State of Pennsylvania, have invented a certain new and useful Improvement in Gas-Mixers, of which the following is a specification.

One object of the present invention is to provide a dry mixer which shall deliver its output at a substantially constant pressure.

Another object of the invention is to provide a simple, durable, reliable, and efficient mixer.

Another object of the invention is to provide for raising the pressure of the mixture above that of the incoming gas.

To these and other ends hereinafter set forth the invention consists of the improvements hereinafter described and claimed.

The nature, characteristic features, and scope of the invention will be more fully understood from the following description, taken in connection with the accompanying drawings, forming part hereof, and in which—

Figure 1 is a sectional view of the new and improved gas-mixer embodying features of the invention. Fig. 2 is a sectional view taken on the line 2 2 of Fig. 1. Fig. 3 is a sectional view taken on the line 3 3 of Fig. 1. Fig. 4 is a sectional view taken on the line 4 4 of Fig. 1. Fig. 5 is a sectional view taken on the line 5 5 of Fig. 1. Figs. 6, 7, 8, and 9 are diagrammatic views illustrating the different relative positions of the gas and air valves. Fig. 10 is a sectional view illustrating a mixer embodying a modification of the invention and showing the entrance and exit to the air-chamber furnished with puppet-valves instead of D-valves. Fig. 11 is another modification of the bellows; and Figs. 12 and 13 are respectively a sectional plan and a sectional elevation, illustrating a modification of the invention.

Heretofore the commercial production of a mixture of gas and air was accomplished by a wet mixer having two drums mounted on the same axis or connected in some way by gearing, the dimensions or gearing of the drums determining the mixture. Except in a few isolated cases this method of mixing gas and air has never been practical, owing to the fact that the mixers used up too much pressure in revolving through the water, the small area exposed to the pressure of the gas and the large amount of air that must be sucked in reducing the pressure of the gas to such an extent as to leave none for the house-piping. Attempts have been made on account of this difficulty to construct dry meters which would mix the gas and air, the pressure on the gas being transmitted to the air by means of bellows, the best-known case of this sort being that of Armand, No. 87,130, of February 23, 1869. In this the two diaphragms are connected by a rod, so that they both move in the same direction at the same time. However, at the end of each stroke the pressure of the gas will be dead, as the mixer-diaphragms will not be moving, so that the pressure of the mixture will vary from zero to maximum. The first requisite of a dry meter or mixer is that its action be absolutely continuous. As will be seen from the description of my invention, the bellows work at quarter-revolutions, respectively, or thereabout, and in that way perform a continuous action and deliver their output at a substantially constant pressure.

In the drawings, 1 is a housing or casing. As shown, its lower portion is divided into two chambers 2 and 3 by an upright partition 4 and a horizontal partition 5. Within the chambers 2 and 3 are arranged bellows 6 and 7. These bellows are arranged for expansion and contraction in respect to the partition 4, and they are shown as internally subdivided, so as to provide within them compartments 8 for air and 9 for gas. The partition 4 is provided upon its opposite faces with ducts 11 and 12, Fig. 1, of which the duct 11 serves to convey gas to the gas-compartment 9 and the duct 12 to convey air to the air-compartment 8. As shown, the bellows are of generally rectangular form, and accuracy in their movements is promoted by the provision of a pivotal yoke 13, of which the arms work through suitable keepers, as shown in Fig. 1. Above the partition 5 and on top of it is arranged a partitition-wall 14 and inclined walls 15, which bound gas-chambers 16 and 17, through which the gas passes on its way to and from the bellows. These walls also, together with walls 18, bound chambers 19 and 20, through which the gas passes on its way to and from the chambers 2 and 3. There are also passages 21 and 22 inclosed by suitable walls, and these lead to a passage 24, which communicates with the chamber 25 at the top of the casing 1, which chamber 25 serves to receive and deliver the mixture of air and gas. Above the plate 5 and the walls which are carried by it is arranged another plate 26, Fig. 4. On top of this plate 26 is arranged V-shaped walls 27 and 28, connected by a longitudinally-ranging wall 29 and also a crosswise-ranging wall 30. These walls serve to form an air-inlet chamber 31, chambers 32 and 33, through which air passes on its way to and from the bellows, and a gas-inlet chamber 34. Above these walls there is a plate or partition 35, Fig. 3, which forms their top and also separates them from the chamber 25. Air enters chamber 31 by way of inlet 36. From chamber 31 air is admitted to chamber 32 or 33, according as the bellows are moving one way or the other. To accomplish this, the plate 35 is provided with ports $a$ $a'$ and $b$ $b'$. D-valves A and B coöperate with these ports. When the D-valve A spans both of the ports $a$ $a'$, air passes from chamber 31 to chamber 32, and when D-valve B spans ports $b$ $b'$ air passes from chamber 31 to chamber 33. From chambers 32 and 33 air reaches the bellows by way of the passages 12 and $12^a$, Fig. 4, which passages extend through the plate 5 and merely penetrate the partition 26. Upon leaving the bellows the air comes back over the same passage to the chambers 32 or 33, as the case may be, and when the D-valve A uncovers port $a'$ the air can escape from 32 through $a'$ into 25, and when D-valve B uncovers port $b'$ air can escape from chamber 33 into chamber 25. The pressure of the mixture in the chamber 25 exceeds the pressure of the air in the chamber 31, so that the D-valves A and B are placed on top of the partition 35 and in the chamber 25. The entering air passes under the valves, and their upper sides are exposed to the pressure of the air and gas in the chamber 25, which exceeds the pressure of the air. In this way they are held to their seats and their proper operation is insured. Gas entering at 37 reaches the chamber 34. From the chamber 34 there are ports $c$ and $d$, which lead, respectively, to the chambers 16 and 17, Fig. 5. In turn these chambers 16 and 17 communicate, by way of the ducts 11 and $11^a$, with the respective gas-compartments of the bellows. There are also ports $c'$ and $d'$, which communicate by way of ducts 39 and 40, Fig. 5, with the chambers 2 and 3, so that gas passing through these ducts may reach these chambers outside of the bellows. There are also ports $c^2$ and $d^2$, which lead to the passages 21 and 22, Fig. 5. Each of the valves C and D may be similarly positioned in respect to its various ports, so that a description will be given of only one of these valves. When the valve D uncovers its port $d$, gas passes from the chamber 34 to the chamber 17 and from thence by $11^a$ to the bellows. When the valve D uncovers the port $d'$, gas passes by way of passage 20 into passage 40 to compartment 2. When the valve D spans either of the ports $d$ or $d'$ and $d^2$, it serves to convey the gas from either of the ports $d$ or $d'$, as the case may be, through the port $d^2$ into the passage 22 and thence by way of 24 to the chamber 25, so that gas is conducted either from within the bellows or from the outside of the bellows into the chamber 25 in this way. For the sake of a clearer description of my invention it will be assumed that the bellows X is collapsing and that the bellows Y is about to collapse, it being understood that while one bellows is traveling between its extreme positions the other bellows is traveling from its midway position to either of its extreme positions and back again to its middle position, as the case may be, the object being to deliver a uniform pressure of the mixture. Upon the above assumption air is escaping from compartment 8 by way of $12^a$ to chamber 33 and by way of port $b'$ to chamber 25. Gas is escaping from 9 by way of $11^a$ to chamber 17, by port $d$ through valve D to 22, and by way of 24 to chamber 25. Of course the air and gas mix in the chamber 25, and the relative proportions are determined by the respective volumes of the chambers 8 and 9, and thus the production of a mixture of definite proportions of air and gas is accomplished. At the same time gas is escaping from the chamber 34 by way of the port $d'$ to the chamber 20 and by way of 40 to the chamber 2, and this gas pressing upon the exterior of the bellows X is exerting its force to collapse it. The bellows Y, if not entirely filled, will be filling in the manner about to be described. The gas that had been previously introduced into the chamber 3 escapes therefrom through 39, 19, port $c'$, through valve C, through port $c^2$, through 21 to 24, and from thence to the chamber 25. Its volume is also, of course, known and adds itself to the mixture in the chamber 25. In expanding the bellows Y draw in gas by way of 34, port $c$, 16, and the duct 11 and air by way of chamber 31, port $a$, through valve A, port $a'$, chamber 32, and duct 12. The described operation is repeated as the bellows expand and collapse, and thus there is supplied continuously a mixture of air and gas in known proportions at the chamber 25, from which it can be delivered for any suitable purpose and at a substantially constant pressure. Referring to Fig. 11, separate bellows are provided for gas and for air, which are arranged side by side instead of one within the other; otherwise the construction and operation are as above described. In Fig. 10 I have shown an apparatus in which the supply of air is taken in differently from the arrangement above described. In the apparatus shown in Fig. 10 the inlet 41 extends through the bottom of the device and is there provided with a puppet or flap valve 42. Above the ports 43, which extend from 41 to the chamber 8, there is another flap or puppet valve 44. In this construction the chambers 31, 32, and 33 and the valves A and B are dispensed with. Referring to Fig. 10, as the bellows expand the valve 42 opens and air enters by 41 and 43 and is drawn into the chamber 8. As the bellows collapse valve 42 closes, valve 44 opens, and the air is expelled by way of 41 directly into the chamber 25. With the exceptions above noted the construction and mode of operation of the modification shown in Fig. 10 are as above described with respect to Figs. 1 and 2. By a proper multiplication of bellows or compartments in bellows it is possible to obtain any required proportions of air and gas. In Figs. 12 and 13 I have shown an arrangement by which these results can be accomplished. The construction and mode of operation of the device shown in Figs. 12 and 13 are as above described with reference to Figs. 1 and 2 except as follows: $y$ is an additional gas-bellows, which has communication with a duct 61. The space $3^a$ serves as an air-space. Air is supplied to this space $3^a$ by way of a passage or tube 62. This passage or tube 62 constitutes an additional or third port for the air D-valve, which is designated B on Fig. 3. Air, as is shown in Fig. 12, is supplied by way of a conduit 63, so that from 63 the air is delivered either to 62 or to $b'$, according to the position of the valve B. When the valve uncovers the port 62, the air escapes into the chamber 25. 64 is a conduit or passage which extends from port $d'$ to the passage 61 and serves to convey gas to the interior of the bellows $y$, instead of delivering it into the chamber 3. It will be understood that only one half of the device has been shown and described in Figs. 12 and 13; but the other half is just the same. Since the gas is confined in the bellows $y$, it follows that a larger proportion of air is introduced into the mixture than is done in the arrangement shown in Figs. 1 and 2.

From the foregoing description it is obvious that the movements of the various D-valves must be properly timed in relation to each other, and I will proceed to describe mechanism well adapted to operate these valves and to time their movements to cause the device to operate as a whole in the manner above described.

45 is a shaft provided with cranks 46, 47, and 48. The crank 48 is connected with the spindles of the valves A and B. The crank 47 is connected with the spindle of the valve D, and the crank 46 is connected with the spindle of the valve C. The crank 48 is positioned ninety degrees from the cranks 46 and 47, and such a relative arrangement of cranks insures the described relative movements of expansion and contraction of the bellows X and Y. The movement of rotation is imparted to the shaft 45, and during each of its revolutions each of the bellows X and Y makes one complete stroke, impelled to do so through the described operation of the various valves which control it. Fig. 6 shows the position of the valves when the bellows X are expanding from their middle position and the bellows Y is in its extreme position outward, so that X is discharging gas from the outside of the bellows, Y being on the end of a stroke, doing nothing. In Fig. 7 the bellows Y is on its intermediate position inward, discharging gas and air from the inside, while the bellows X is at its extreme outward position. In Fig. 8 the bellows Y has finished its inward motion and the bellows X is at its intermediate position on the inner stroke, discharging gas from the inside. In Fig. 9 the bellows Y is at the middle position of its outward stroke and the bellows X is at the extreme position inward, the bellows Y discharging gas from the outside. The shaft 45 may be rotated by the application of power to it—for example, by means of the shaft 49 and gearing $50^b$—or it may be rotated by the pressure of the gas acting through the instrumentality of the bellows. For this purpose flags 50 and $50^a$, having slide contact with the bellows, may be provided. These flags 50 and $50^a$ are mounted on flagstaffs 51 and 52. At the upper ends of these flagstaffs are mounted cranks 53 and 54, which are connected, through the intervention of links 55 and 56, with a crank 60 on the shaft 45. The cranks 53 and 54 are arranged with reference to each other as shown and the same as the bellows X and Y—that is, when one is at the end of a stroke the other is at the middle of a stroke—and this prevents the crank 60 from ever being on a dead-point. By the motion in and out of the bellows the cranks 53 and 54, in connection with 55 and 56, give the crank 60 a rotary movement, thus operating the crank-shaft 45 and the cranks 46, 47, and 48, and thereby the valves A, B, C, and D. The application of power to the shaft 49 in excess of the power required to move the various parts may obviously be made to serve to increase the pressure of the mixture of air and gas above the pressure of the incoming gas.

It will be obvious to those skilled in the art to which the invention relates that modifications may be made in details without departing from the spirit thereof. Hence I do not limit myself to the precise construction and arrangement of parts hereinabove set forth, and illustrated in the drawings; but,

Having thus described the nature and ob- jects of the invention, what I claim as new, and desire to secure by Letters Patent, is—

1. A dry gas-mixer comprising chambers of variable capacity and of which some operate upon air and some upon gas, a mixing-chamber common to all of said chambers, and admission and eduction valves and their accessories for constraining at least some one of said first-mentioned chambers to discharge into the mixing-chamber at all times, substantially as described.

2. A dry gas-mixer comprising sets of double bellows of which some bellows operate on air and some on gas, chambers respectively inclosing the sets of bellows, a mixing-chamber common to all of the bellows, and valves and their accessories for causing a discharge at all times into said mixing-chamber, substantially as described.

3. A dry gas-mixer comprising sets of bellows of which some bellows operate on air and some on gas, chambers respectively inclosing the sets of bellows, a mixing-chamber common to all of the bellows, valves and their accessories for causing a discharge at all times into said mixing-chamber, a revoluble crank-shaft, mechanism interposed between the bellows and the crank-shaft for rotating it, and valve-gear interposed between said shaft and valves, substantially as described.

4. A dry gas-mixer comprising sets of bellows of which some bellows operate on air and some on gas, chambers respectively inclosing the sets of bellows, a mixing-chamber common to all of the bellows, valves and their accessories for causing a discharge at all times into said mixing-chamber, and means for applying power for driving said bellows, substantially as described.

5. A dry gas-mixer consisting of chambers of variable volume of which some operate on air and some on gas, a mixing-chamber, an air-intake chamber, a second air-chamber having communication with some of the chambers of variable volume, valves and their ports for establishing communication between the air-intake chamber and the second air-chamber and the mixing-chamber, a gas-intake chamber, two second gas-chambers having communication with some of said chambers of variable volume, a gas offtake-chamber having communication with the mixing-chamber and with said second gas-chambers, valves and their ports for controlling the passage of gas, and mechanism for operating said valves, substantially as described.

6. In a dry gas-mixer the combination of a mixing-chamber, an air-intake chamber and a second air-chamber beneath the same, ports from the mixing-chamber to each of the air-chambers, and a D slide-valve mounted in the mixing-chamber, whereby the pressure therein holds the same properly to its seat, substantially as described.

7. In a dry gas-mixer the combination of a chamber of variable volume, an induction and eduction connection therefor, and puppet-valves operatively arranged in respect to said connections, substantially as described.

8. In a dry gas-mixer, chambers of variable capacity or volume, of which some operate on air and of which some are operated by gas, valves and their operating mechanism for controlling the induction and eduction of gas, and air-valves and their accessories operatively connected with the gas-valve-operating mechanism, substantially as described.

9. In a gas-mixer a pair of air-valves, a pair of gas-valves, and a revoluble shaft provided with three cranks, of which two appertain to the gas-valves and one to the air-valves, substantially as described.

10. In a gas-mixer, a pair of air-valves, a pair of gas-valves, and a revoluble shaft provided with three cranks set ninety degrees apart, and of which the intermediate one appertains to the air-valves and the others respectively to the gas-valves, substantially as described.

In testimony whereof I have hereunto signed my name.

JOHN FREDERICK W. JOST.

Witnesses:
W. J. JACKSON,
FRANK T. KALAS.